United States Patent

Misek

[15] 3,677,647

[45] July 18, 1972

[54] ELECTRO-OPTICAL TARGET MOTION SENSOR

[72] Inventor: Victor A. Misek, Hudson, N.H.
[73] Assignee: Sanders Associates, Inc., Nashua, N.H.
[22] Filed: Aug. 17, 1970
[21] Appl. No.: 66,156

[52] U.S. Cl. ............................................356/28, 356/147
[51] Int. Cl. .........................................G01p 3/36, G01c 1/00
[58] Field of Search ....................356/28, 147; 250/219 LG

[56] References Cited

UNITED STATES PATENTS

| | | |
|---|---|---|
| 2,142,378 | 1/1939 | Sachtleben ..............................356/28 |
| 2,942,119 | 6/1960 | King et al.................................356/28 |
| 3,351,768 | 11/1967 | Cooke .....................................356/28 |

*Primary Examiner*—Benjamin A. Borchelt
*Assistant Examiner*—S. C. Buczinski
*Attorney*—Louis Etlinger

[57] ABSTRACT

An electro-optical target motion sensor comprises a pair of photodetector elements upon which an image is focused through cross correlation gratings which are spatially phase shifted with respect to one another. The detector outputs are electrically phase shifted and processed to provide output signals representative to the velocity and direction of motion of a target image.

10 Claims, 5 Drawing Figures

Patented July 18, 1972

3,677,647

(a)

(b)

(c)

INVENTOR
VICTOR A. MISEK
BY Robert Van Epps
AGENT

3,677,647

ELECTRO-OPTICAL TARGET MOTION SENSOR

BACKGROUND OF THE INVENTION

1. Field of the Invention

The present invention relates most generally to the field of electrooptics and more particularly to a new and novel method and apparatus for detecting the velocity and direction of a moving optical target.

2. Description of the Prior Art

Prior to the present invention a primary approach to solving the problem of tracking an optical target in angular velocity was to use a conventional tracker wherein the target image is maintained at the center of a detector and the entire tracker optical head is driven by a servo system to maintain the image in the centered position. Electrical pickoffs are then used to determine the head position and these signals are processed to determine angular rates. As with any system requiring the use of servo systems to mechanically slew an optical head the angular rates which may be followed are limited and sudden angular acceleration of the target generally results in the tracking being broken.

OBJECTS AND SUMMARY OF THE INVENTION

It will be understood from the foregoing that among the various objectives of the present invention are:

To provide a new and novel electro-optical target motion sensor.

To provide apparatus of the above described character which senses the polarity and amplitude of the velocity of an optical target.

To provide apparatus of the above described character using spatially phase shifted cross-correlation gratings.

To provide apparatus of the above described character wherein the signal to noise ratio is enhanced.

In achieving the foregoing as well as other objectives there is provided an optical system for collecting energy from an optical target. The collected energy is divided into two optical channels, directed through spatially phase shifted cross-correlation gratings and focused on first and second photoelectric detector elements. The electrical output signals of the detectors will be a.c. only for moving optical targets. The electrical signal from one detector is phase shifted and combined with that from the other detector to provide an output which is indicative of the amplitude and polarity of the target velocity vector.

These and other objectives, features and advantages of the present invention will become more apparent from the following detailed discussion taken in conjunction with the appended drawings.

DESCRIPTION OF PREFERRED EMBODIMENT

Figure 1:
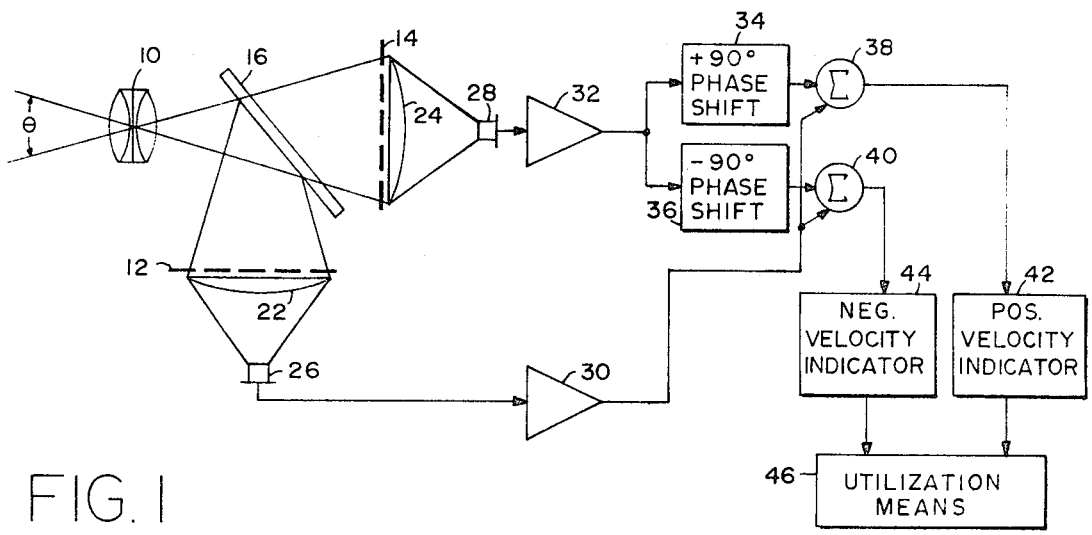
FIG. 1 is a schematic illustration of an optical target motion sensor constructed in accordance with the principles of the present invention.

Turning now to FIG. 1 there is illustrated an electro-optical target motion sensing apparatus in accordance with the present invention. An objective 10 focuses the image of a remote object (not shown) moving within the field-of-view $\theta$ onto cross-correlation gratings 12 and 14 by means of a beam splitter 16. A multielement objective lens 10 is shown, however, it will be understood that the invention is equally operative with a broad variety of collecting and focusing means, both refractive and reflective. For the purposes of illustration the gratings 12 and 14 may be considered to be simple square wave gratings comprising alternating opaque and transparent bars disposed in a constant spatial frequency as illustrated at 18 and 20 of FIG. 3(a). If the wavelength of the spatial wave; i.e. the transverse dimension of the alternating bars 18 and 20, is approximately twice the diameter of the circle of confusion of the objective 10, the image of an object moving across the gratings 12 and 14 will produce a basically sinusoidal fluctuation in the radiant flux passing through the gratings. This effect will be maintained regardless of the shape of the image. The frequency of the fluctuation will be proportional to the angular velocity of the target in the field-of-view and to the spatial frequency of the gratings.

Correlation grating 14 is disposed with respect to the objective 10 such that it is displaced by +90° in spatial phase with respect to correlation grating 12. By displacing grating 14 with respect to grating 12 the phasing of the fluctuation of the radiant flux passing through the grating 14 also has a phase shift of +90°. The radiant flux passing through the gratings 12 and 14 is collected by first and second focusing means, illustrated as plano-convex lenses 22 and 24 respectively, which focus the entrance pupil of objective 10 onto first and second photoelectric detector elements 26 and 28 respectively. The detector outputs are a.c. coupled to first and second preamplifiers 30 and 32. The output of preamplifier 32 shall hereinafter be termed channel A and that of preamplifier 30 designated channel B.

Assuming now that an optical target or object moves from left to right across the field-of-view, $\theta$, normal to the grating lines in the image planes, the phase of the electrical signal on channel A will lead that on channel B by 90°. Conversely, if the direction of target motion is reversed the signal on channel B will lead that on channel A by 90°. Due to this phenomenon it is possible to establish the direction in which the target is moving.

The signal on channel A is applied to positive and negative 90° phase shifters 34 and 36 respectively, and is thus shifted 90° with respect to the channel B signal. The outputs of the +90° and −90° phase shifters are each respectively summed with the channel B signal in summing networks 38 and 40. The output signals from each of the summing networks 38 and 40 are coupled to positive and negative velocity indicators 42 and 44 respectively both of which may be coupled to any suitable utilization means 46 as will be more fully discussed hereinbelow.

In the apparatus of Fig. 1, through the use of a 50 percent transmissive beam splitter 16 the amplitudes of the electrical signals in channels A and B may be maintained substantially equal. In the case of a target moving from left to right through the field of view the phase of the signal in channel A leads that of the signal in channel B BY 90°. In the +90° phase shifter the channel A signal is shifted by an additional 90° resulting in a total phase shift of 180° with respect to channel B. When this signal is summed with channel B in summing network 38 the net output to the positive velocity indicator 42 is zero. In the −90° phase shifter 36 the original +90° phase shift is cancelled and the signal in channel A adds in phase with that in channel B. The output of summing network 40 is thus twice the amplitude of that in the individual channels and is coupled to negative velocity indicator 44. The signal to noise ratio is also enhanced by 3 db since the signals add in phase and the noise adds randomly.

Where an object in the field of view moves from right to left, channel A lags channel B by 90°. This lagging signal is shifted by +90° in phase shifter 34 resulting in a net phase difference of zero with respect to channel B. The output of phase shifter 34 thus adds in phase with the signal on channel B and the output of summing network 38 is twice the amplitude of the individual channels. In the −90° phase shifter 36 the channel A signal is subjected to an additional 90° phase shift and thus is 180° from the phase of the signal in channel B. The output of summing network 40 is thus zero. Thus the velocity of an object moving from right to left in the field of view $\theta$ will produce an indication on the positive velocity indicator 42.

The velocity indicators may be of any suitable type such as a simple frequency meter or a more complex doppler filter bank known in the art. In either case the angular velocity of the object is determined from the frequency of the signal applied to the indicator.

It will be apparent in view of the foregoing discussion that by using another motion sensor as shown in FIG. 1 but having cross-correlation gratings disposed at 90° with respect to the first apparatus and covering the same field of view, both the X and Y components of a target velocity may be determined.

As stated hereinabove the operation of the apparatus of FIG. 1 is unaffected by the shape of the target. The target further may as easily be light against a dark background or dark against a light background. The invention is also operative independently as a passive system or may be further combined with an illuminator to provide an active system.

Figure 2:
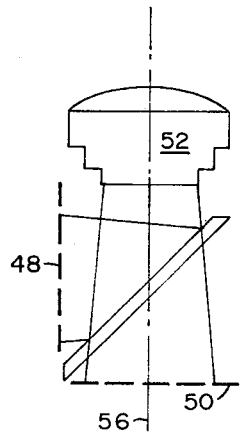
FIG. 2 is a schematic illustration of an embodiment of the present invention having a substantially hemispherical field of view.
Figure 3:
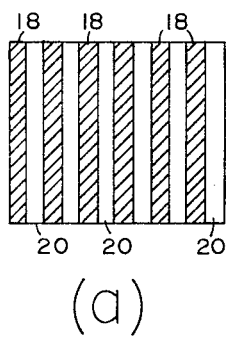
FIGS. 3 (a), (b) and (c) are illustrations of various correlation gratings having utility in the practice of the present invention.
Figure 3:
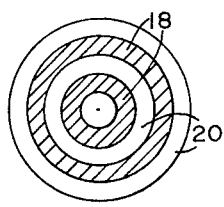
Figure 3:
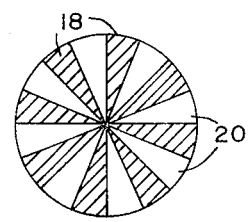

FIG. 2 illustrates in part another embodiment of the present invention. In this embodiment concentric cross-correlation gratings 48 and 50, such as illustrated in FIG. 3(b), are used in combination with a hemispherical objective 52 and beam splitter 54. The concentric gratings 48 and 50 comprise alternating opaque and transparent annuli 18 and 20 respectively and when combined with the remainder of the motion sensor as illustrated in FIG. 1 operates to determine the angular velocity of a target (not shown) with respect to the optical centerline 56 and whether the velocity is opening or closing. Although a hemispherical lens system 52 is shown it will be understood that either reflective or refractive objectives with a more or less restricted field of view are of equal utility in the practice of the present invention.

The 90° spatial phase shift between cross-correlation gratings 48 and 50 may be established by decreasing or increasing the radii of one of the gratings by one quarter of a spatial cycle. When employed with the hemispherical objective 52 as illustrated the concentric gratings 48 and 50 modulate the radiant flux passing therethrough as a function of the angular velocity of the target and by the same techniques and apparatus as discussed hereinabove with respect to FIG. 1 the magnitude and direction of the target velocity vector may be determined.

The apparatus of FIG. 1 when combined with the hemispherical lens to measure the x and y components of velocity in the image plane could for example be applied to the detection of missile launchings over a 360° azimuth field of view. The direction of the angular velocity vector in the case of a vertical launch would indicate the azimuth position of the missile. When used to detect launchings only on the horizon it will be apparent that much of the unused field of view of the hemispherical lens could be blocked and thus avoid excess background radiation from entering the system.

In order to locate a missile launching which is not vertical it is necessary that the portion of the velocity vector parallel to the horizon be subtracted. This may be accomplished by providing a radial mask of the type shown in FIG. 3(c) to permit measurement of that component of velocity which is tangential to the horizon. The spatial phase of such correlation gratings may be shifted by the necessary 90° by merely rotating one of them a quarter cycle with respect to the other. When the tangential vector is subtracted from the Cartesian coordinate vector derived by using the gratings of FIG. 3(a), the direction of the resulting vector corresponds to the azimuth position of the missile launch.

The apparatus of FIG. 1 when used with radial correlation gratings comprising alternating opaque and transparent radial segments 18 and 20 respectively such as illustrated in FIG. 3(c), has application to the solution of a wide variety of problems. It could for example be used to measure roll rate and direction of an aircraft, spacecraft or missile with respect to a background image such as terrain, horizon, light sources, a star field or the like. It further could be applied to measure the speed of rotating machinery and indicate the direction of rotation when the speed is too fast for the eye to determine. In such an application the utilization means 46 may include an FM discriminator having a zero output only at the correct rotation speed of the equipment being monitored. At speeds above the correct speed the utilization means output is of such polarity that when coupled to a speed control would reduce the speed to the proper value. Conversely at speeds lower than the correct one a higher speed is called for. Rotation speed control may also be achieved by use of a phase detector rather than a discriminator. In such a case the angular speed would be phase locked to a stable oscillator or clock generator in the utilization means.

The foregoing discussion is of but a few of the many applications of the present invention the basic nature of which is illustrated in FIG. 1. Since other applications and embodiments will occur to those skilled in the art without departing from the scope of the invention it is intended that all matter contained in the above description or shown in the appended drawings shall be interpreted as illustrative and not in a limiting sense.

Having described what is new and novel and desired to secure by Letters Patent, what is claimed is:

1. Apparatus for detecting motion of an optical target comprising
    means for collecting optical energy from said target and for focusing said energy;
    means for dividing said focused energy into first and second optical paths;
    first and second correlation gratings disposed in said first and second optical paths respectively, each at a focal plane of said collecting and focusing means, and said first correlation grating being displaced by a preselected amount in spatial phase with respect to said second correlation grating;
    first and second photoelectric detector elements disposed such as to receive optical energy passed by said first and second correlation gratings respectively and producing an alternating electrical output when the image of said moving target moves across said correlation gratings; and
    means coupled to said photoelectric detector elements for processing the electrical output signals therefrom to produce an output signal representative of the amplitude and polarity of the optical target velocity vector.

2. Apparatus as recited in claim 1 wherein said signal processing means includes
    first and second means coupled to said first detector element for respectively positively and negatively shifting the phase of the alternating electrical output signal therefrom by an amount corresponding to the spatial phase displacement between said first and second correlation gratings,
    means coupled to said positive phase shifting means and to said second detector element for combining the alternating signals therefrom to thereby produce an output signal indicative of positive motion of said optical target, and
    means coupled to said negative phase shifting means and to said second detector element for combining the alternating signals therefrom to thereby produce an output signal indicative of negative motion of said optical target.

3. Apparatus as recited in claim 2 wherein
    said first correlation grating is displaced by substantially 90° in spatial phase with respect to said second correlation grating, and
    said first and second phase shifting means are positive and negative 90° phase shifting circuits.

4. Apparatus as recited in claim 1 wherein
    said first and second correlation gratings comprise a plurality of alternating opaque and transparent bars of a substantially constant spatial frequency.

5. Apparatus as recited in claim 4 wherein
    the transverse dimension of each said opaque and transparent bars is substantially twice the diameter of the circle of confusion of said collecting and focusing means.

6. Apparatus as recited in claim 1 wherein
    said collecting and focusing means comprises a hemispherical lens, and said first and second correlation gratings comprise a plurality of alternating concentric opaque and transparent annuli of a substantially constant spatial frequency
whereby the output signal of said signal processing means is representative of the amplitude and polarity of the optical target velocity vector relative to the optical axis of said hemispherical lens.

7. Apparatus as recited in claim 6 wherein
the radial dimension of each said opaque and transparent annuli is substantially twice the diameter of the circle of confusion of said collecting and focusing means.

8. Apparatus as recited in claim 1 wherein
said first and second correlation gratings comprise a plurality of alternating opaque and transparent radial segments of a substantially constant spatial frequency
whereby the output signal of said signal processing means is representative of the amplitude and polarity of the angular velocity of said optical target.

9. Apparatus as recited in claim 1 further including
means coupled to said signal processing means for indicating the amplitude and polarity of the optical target velocity vector.

10. Apparatus as recited in claim 9 wherein
said indicating means comprises first and second frequency meters, said first frequency meter providing an indication of the velocity of positive motion of said optical target, and said second frequency meter providing an indication of the velocity of negative motion of said optical target.

* * * * *